US007721520B2

(12) United States Patent

Komeya et al.

(10) Patent No.: US 7,721,520 B2
(45) Date of Patent: May 25, 2010

(54) CHAIN DISCONNECTING AND CONNECTING TOOL

(75) Inventors: Akiyoshi Komeya, Kaga (JP); Susumu Hirasawa, Kaga (JP)

(73) Assignee: Daido Kogyo Co., Ltd., Ishikawa (JP)

( * ) Notice: Subject to any disclaimer, the term of this patent is extended or adjusted under 35 U.S.C. 154(b) by 0 days.

(21) Appl. No.: 12/386,244

(22) Filed: Apr. 15, 2009

(65) Prior Publication Data

US 2009/0255229 A1 Oct. 15, 2009

(30) Foreign Application Priority Data

Apr. 15, 2008 (JP) ............................ 2008-105704

(51) Int. Cl.

| | |
|---|---|
| ***B21L 21/00*** | (2006.01) |
| ***B23P 21/00*** | (2006.01) |
| *B25B 27/14* | (2006.01) |

(52) U.S. Cl. ......................... 59/7; 59/9; 59/11; 59/35.1

(58) Field of Classification Search ....................... 59/7, 59/9, 11, 35.1

See application file for complete search history.

(56) References Cited

U.S. PATENT DOCUMENTS

| | | | | |
|---|---|---|---|---|
| 2,387,551 | A * | 10/1945 | Herbert | 59/7 |
| 2,783,611 | A * | 3/1957 | Simpkin et al. | 59/7 |
| 2,931,165 | A * | 4/1960 | Tehven | 59/7 |
| 3,553,960 | A * | 1/1971 | Ellefson | 59/7 |
| 4,833,875 | A * | 5/1989 | Buermann et al. | 59/7 |

FOREIGN PATENT DOCUMENTS

| | | |
|---|---|---|
| JP | 8-229756 | 9/1996 |

* cited by examiner

*Primary Examiner*—David B Jones
(74) *Attorney, Agent, or Firm*—Jordan and Hamburg LLP

(57) ABSTRACT

A highly durable and compact chain disconnecting and connecting tool that may be used for a chain at a sprocket part for winding the chain and that can receive an operational load at two places is provided. A first block has an engaged pressure actuating member coupling member. A second block is coupled with the first block turnably by the coupling member and has a cutout on one side and a through hole on another side of the block. The tool is attached to the chain from an opening while positioned engagement with an edge projection of a tap bolt that is screwed with the first block and with the cutout or the through hole.

7 Claims, 6 Drawing Sheets

CHAIN DISCONNECTING AND CONNECTING TOOL

CROSS REFERENCE TO RELATED APPLICATIONS

This application claims the foreign priority benefit under Title 35, United States Code, §119(a)-(d) of Japanese Patent Application No. 2008-105704, filed on Apr. 15, 2008, in the Japan Patent Office, the disclosure of which is herein incorporated by reference in its entirety.

BACKGROUND OF THE INVENTION

1. Field of the Invention

The present invention relates to a chain disconnecting and connecting tool for use for chains such as a roller chain for disconnecting the chain by pulling (removing) a pin out of the chain and connecting the chain by caulking (deforming) an end of a pin of a joint link (chain linking member) and more specifically to a chain disconnecting and connecting tool suitably applied to a motorcycle driving roller chain.

2. Related Art

Heretofore, the present applicants have proposed a chain disconnecting and connecting tool as disclosed in Japanese Patent No. 3431361 for example. This tool has first and second bodies whose right and left sides are opened in a direction of a longitudinal direction of a chain, that engage from each other in a vertical direction of the chain and that are coupled so as to be unable to relatively move in a direction of nipping the chain. The first body is provided with a pressure actuating member for pressing a pin or a plate of the chain and the second body is provided with a through hole through which the pin of the chain may penetrate and a slider having a pin abutting portion to which an end of the pin may abut.

The pin may be pulled out the chain and the chain may be disconnected by mounting the pin to be pulled out to the pressure actuating member and pressing the pressure actuating member toward the chain by means of screw engagement while adjusting the slider with the through hole. In contrast, the chain may be connected by caulking (deforming) an end of a pin of the chain by mounting the pin to be caulked (deformed) to the pressure actuating member and pressing the pressure actuating member toward the chain while adjusting the slider with the pin abutting portion.

Because the chain disconnecting and connecting tool described above has a center impeller structure with the first and second bodies, i.e., separate members, engaged in the vertical direction of the chain, the tool can fully sustain an operational load such as caulking (deformation) and may be downsized and lightened so as to be conveniently portable. Still more, the tool can nip a chain by separating the first and second bodies while attaching the chain to a motorcycle, so that workability could be improved.

However, because the chain disconnecting and connecting tool described above has had the center impeller structure in an operational state in which the first body is engaged with the second body, the operation is obliged to be carried out in a free span of the chain wound around between a driving sprocket wheel and a driven sprocket wheel. Therefore, there have been cases when the place to which the chain disconnecting and connecting tool is attached is limited, the operation becomes cumbersome or it becomes difficult to use the tool, depending on a shape of a swing arm of the motorcycle.

It is noted that although there also exists a chain disconnecting and connecting tool having a cantilever structure with a body block in a shape of C, this tool has had problems that in terms of durability, the body block is readily deformable due to the cantilever structure and that the tool would be large and heavy and be inconvenient to carry when a robust and highly rigid body block is used.

Accordingly, the present invention seeks to provide a chain disconnecting and connecting tool that solves the abovementioned problems by constructing the tool so that it may be used at a winding part of a sprocket of a chain and so as to receive an operational load at two places.

SUMMARY OF THE INVENTION

A chain disconnecting and connecting tool of the invention for disconnecting a chain by pulling (removing) a pin out of the chain and for connecting the chain by caulking (deforming) a pin of a chain linking member includes:

A chain disconnecting and connecting tool for disconnecting a chain by removing a pin out of the chain and for connecting the chain by deforming a pin of a chain linking member with a remainder thereof, comprising:

a first block;

a pressure actuating member engaged with the first block;

a second block having a cutout into which a head of the pin of the chain linking member may be fitted and a through hole through which the pin of the chain may be inserted, and disposed selectively with respect to the pressure actuating member so that the cutout or through hole thereof aligns with the pressure actuating member, the pressure actuating member being laterally moveable between the first and second blocks for contacting the chain pin of the chain during disconnection or connection thereof;

a coupling member for coupling the first and second blocks, and for supporting a tensile force acting thereon during disconnection or connection of the chain; and a tap member, disposed on an opposite side of the pressure actuating member with respect to the coupling member, for supporting a compressive force acting thereon during disconnection or connection of the chain, the tool being attachable to the chain from an opening of the tool at an opposite side of the tap member with respect to the coupling member; and a grip engaged with the first block for enabling a user to grasp the tool during use thereof.

Specifically, as shown in FIG. 2 or 6 for example, the second block has the closed-end hole (cutout) on one side, the through hole on the other side and a round hole disposed at an intermediate portion between the closed-end hole and the through hole for fitting (receiving) a coupling member for coupling with the first block rotatably while being blocked from moving in a direction away from the first block.

The tap member is a tap bolt screwed into the first block to be freely movable forward and backward in a direction in parallel with the pressure actuating member and an end portion thereof abuts the second block and engages with either one of the through hole or the closed-end hole so as to position the second block so that the other one of the through hole and the closed-end hole faces to (align with) the pressure actuating member.

Further, as shown in FIG. 1 or 6, the grip is removably fixed to the first block so as to extend within a plane substantially orthogonal to a direction in which the pressure actuating member moves forward and backward, i.e., laterally.

It is noted that although it may be preferable in terms of machining to dispose the grip so as to extend in the direction of the plane accurately orthogonal to the direction of the pressure actuating member, the plane substantially orthogonal to that direction described above means that the direction of the grip is not strictly restricted to be orthogonal and that the grip may extend outwardly aslant for example. In short, the grip may be extended in any direction as long as the grip can support the large torque applied to the pressure actuating member by the wrench or the like by its length.

As shown in FIGS. 2 through 4, the chain disconnecting and connecting tool further includes an actuation pin having a pin pulling portion in one axial direction and a caulking portion in another axial direction; and a stepped hole formed within the pressure actuating member to store the actuation pin so that the pin pulling portion or the caulking portion switchably faces to (aligns with) the second block.

The chain disconnecting and connecting tool also includes a plate holder having an engaging portion that engages with the actuation pin on one face and an attaching portion to which a link plate of the joint link may be attached on another face as shown in FIGS. 2 and 5 and the plate holder is arranged to be attachable to the actuation pin stored in the pressure actuating member.

Preferably, the grip is disposed on an edge on an opposite side of the pressure actuating member with respect to the tap member in the first block as shown in FIG. 6 for example.

The chain disconnecting and connecting tool further includes an abutting member attached to the distal end portion of the tap bolt rotatably so as to move in the forward and backward directions in a body with the tap bolt and a protrusion formed to an edge of the abutting member so as to be able to engage with either one of the through hole and the closed-end hole.

It is noted that the summary of the invention described above does not necessarily describe all necessary features of the invention. The invention may also be a sub-combination of the features described above.

According to the first aspect of the invention, the chain disconnecting and connecting tool may be attached to any location on the chain such as the driven sprocket part of the motorcycle from the opening of the tool, and may accommodate several types of motorcycles regardless of a shape of a swing arm and may be attached to a part such as the driven sprocket part where the work may be done readily. Thus, the workability may be improved.

Furthermore, although the large force acts on the first and second blocks in the direction of separating them due to the move of the screw of the pressure actuating member in disconnecting or connecting the chain, this force is supported by tensile force acting on the coupling member and compression force acting on the tap member and does not act as a large bending moment on the first and second blocks. This arrangement prevents the first and second blocks, the coupling member and the tap member from deforming even if relatively light and less-rigid materials are used, so that a compact, conveniently portable and fully durable chain disconnecting and connecting tool may be constructed.

According to the second aspect of the invention, the second block has the closed-end hole used in connecting the chain by the joint link on one side thereof and the through hole used in disconnecting the chain on the other side. These closed-end hole and through hole may be selected by rotating the second block centering on the coupling member. At this time, the tap bolt engages with the through hole or the closed-end hole not selected and positions the second block, so that the coupling member and the tap member (bolt) function as the center of rotation and as positioning members in selecting the closed-end hole and the through hole to be used, beside as the members for supporting the operational load. Accordingly, this arrangement requires neither a dedicated plate nor a slider for selecting the closed-end hole and the through hole, allowing the convenient, light and compact chain disconnecting and connecting tool.

According to the third aspect of the invention, the grip is removably fixed to the first block so as to extend to the plane substantially orthogonal to the direction in which the pressure actuating member moves forward and backward, so that the grip that extends substantially in parallel with the chain pitch can steadily support the large torque that acts to the pressure actuating member by the wrench and others. Accordingly, this arrangement allows the workability to be improved even for a highly strong chain of a large-sized motorcycle. Furthermore, because the grip is removably fixed to the first block, the grip may be stored in compact by detaching the grip from the first block even if the grip is constructed to be long to support the large torque of the pressure actuating member.

According to the fourth aspect of the invention, the actuation pin having the pin pulling portion and the caulking portion is stored in the pressure actuating member, so that the actuation pin may be readily switched and may be stored in compact without missing in disconnecting and connecting the chain.

According to the fifth aspect of the invention, the plate holder is attached to the pressure actuating member via the actuation pin, so that the link plate of the joint link may be attached readily and the pressure actuating member may be set closely to the second block so that the plate holder does not come off from the actuation pin and is not missed in storing them for example.

According to the sixth aspect of the invention, the grip is disposed on the edge side of the first block beyond the tap member, so that when the chain disconnecting and connecting tool is attached to the chain, the grip is positioned on the outside of the chain pitch. Accordingly, the chain disconnecting and connecting tool may be readily attached to any part of the chain such as the part wound around the driven sprocket without being disturbed by the mounting bolt and other of the driven sprocket, improving the usability of the tool.

According to the seventh aspect of the invention, the abutting member is rotatably attached to the distal end portion of the tap bolt, so that when the second block is to be positioned, the tap bolt may be readily rotated while abutting the edge thereof to the second block, may support the load acting on the second block at an adequate position and can steadily prevent the bending moment from acting on the coupling member.

BRIEF DESCRIPTION OF THE DRAWINGS

FIG. 2 is an assembly drawing of the chain disconnecting and connecting tool, wherein

FIG. 5 shows a plate holder, wherein FIG. 6 is an assembly diagram of a partially modified chain disconnecting and connecting tool of the invention, wherein

DETAILED DESCRIPTION OF THE INVENTION

Figure 1:
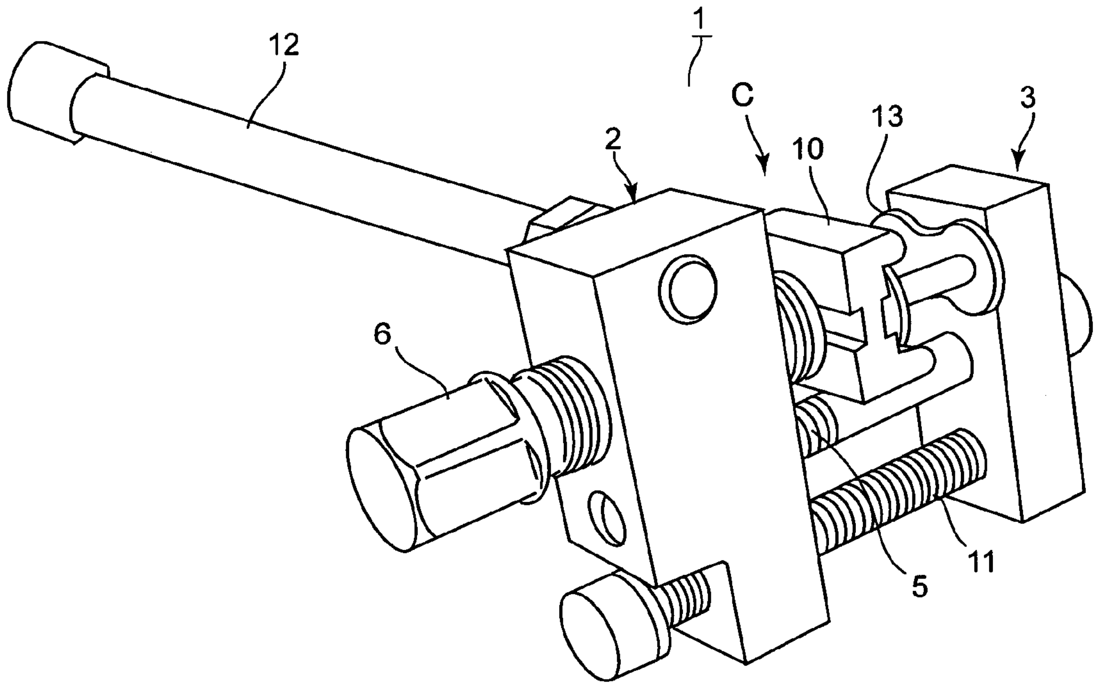
FIG. 1 is a perspective view showing a chain disconnecting and connecting tool of the invention.

The invention will now be described based on preferred embodiments and with reference to the drawings, which do not intend to limit the scope of the invention, but exemplify the invention. All of the features and the combinations thereof described in the embodiments are not necessarily essential to the invention. As shown in FIGS. 1 and 2, a chain disconnecting and connecting tool 1 has a first block 2 and a second block 3 made of a metallic material and these both blocks 2 and 3 are coupled by a coupling bolt (link member) 5 substantially at center parts of the blocks. A distal end portion of the coupling bolt 5 is formed into a male screw 5*a* and is screwed into a screw hole 2*a* of the first block 2. A base portion of the coupling bolt 5 is formed into a non-screwed round bar 5*b* and is fitted (received) into a round holder (through hole) 3*a* of the second block 3 while being retained by a head 5*c*. Accordingly, the second block 3 is coupled to the first block 2 turnably centering on the coupling bolt 5.

The first block 2 has a large screw hole 2*b* for a pressure actuating member formed in parallel with the screw hole 2*a* at one side (an upper side in FIG. 2) of the screw hole 2*a* and a screw hole 2*c* for a pressing bolt having the same diameter with the screw hole 2*a* at another side (a lower side in FIG. 2) thereof. A screw hole 2*d* for a grip is also formed in a direction orthogonal to the direction of the screw hole 2*a* at an edge side of the block beyond the large screw hole 2*b*. An outer side face of the first block 2 where the screw hole 2*c* is located is cut away and is formed as a cut-away concave portion 2*e*.

Meanwhile, the second block 3 has a small round hole (through hole) 3*b* formed in parallel with the round hole 3*a* described above on another side (the lower side in FIG. 2) and three counter boring holes (closed-end holes), in the form of cutouts, 3*c* formed side by side in a transverse direction at an inner face of one side (the upper side in FIG. 2) of the second block 3. It is noted that among the three counter boring holes (closed-end holes) 3*c*, the right and left ones may be formed into a long hole or may be formed into a groove such that right and left edges thereof extend to the right and left ends of the second block 3.

Figure 3:
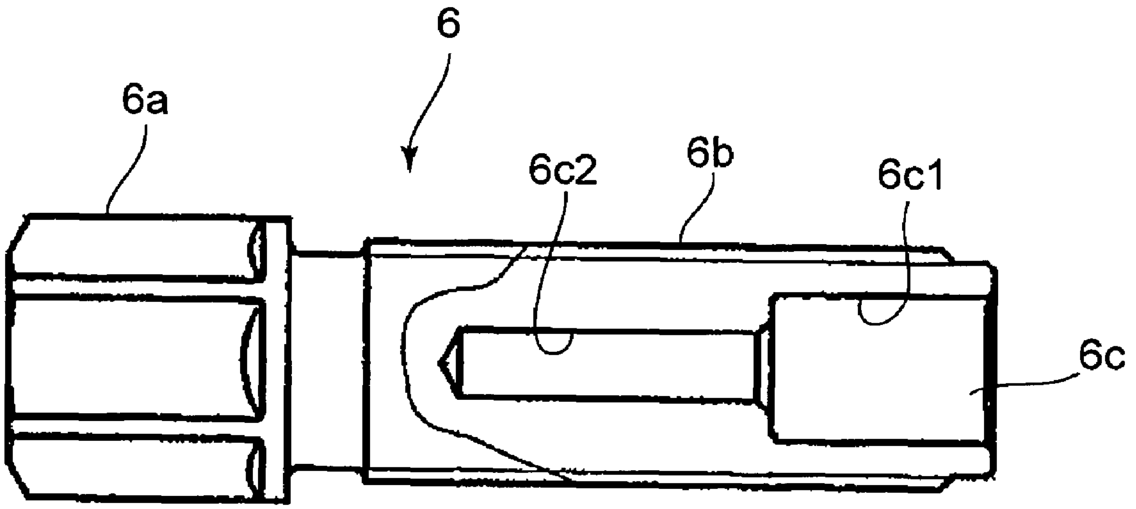
FIG. 3 is a front view partially in section showing a pressure actuating member thereof.

A pressure actuating member 6 is screwed into the large screw hole 2*b* of the first block 2. As shown in detail in FIG. 3, the pressure actuating member 6 has a hexagonal head 6*a*, a male screw portion 6*b* and a stepped hole 6*c* from an end face thereof. The pressure actuating member 6 is used in disconnecting or connecting a roller chain by screwing the male screw portion 6*b* into the first block 2 and by turning the hexagonal head 6*a* by engaging a spanner or a wrench thereto. The stepped hole 6*c* stores an actuation pin 7.

Figure 4:
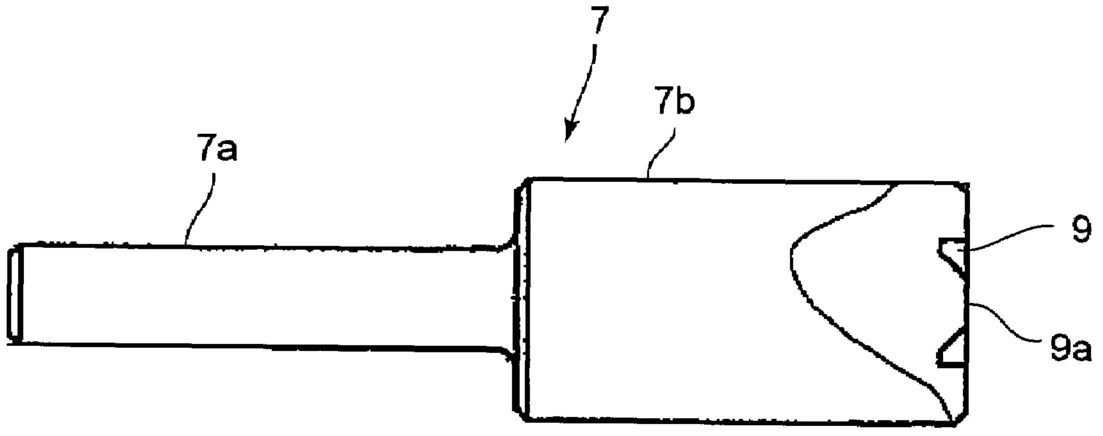
FIG. 4 is front view partially in section showing an activating pin thereof.

As shown in FIG. 4, the actuation pin 7 has a pin pulling (removing) portion 7*a* having a small diameter in one axial direction and a caulking (deforming) portion 7*b* having a large diameter in another axial direction. A ringed groove 9 is formed at end face of the caulking portion 7*b* to caulk (deform) an edge of a pin of a joint link chain linking member by a sloped projection 9*a* formed within the ringed groove 9. Note that while the actuation pin 7 is stored in the stepped hole 6*c* of the pressure actuating member 6 as described above, the pin pulling portion 7*a* of the actuation pin 7 is stored in a smaller portion 6*c*2 of the stepped hole 6*c* or the caulking portion 7*b* is stored in a large diameter portion 6*c*1 of the stepped hole 6*c* while protruding the pin pulling portion 7*a* to the outside at this time. Even in a state when the pin pulling portion 7*a* is stored in the small diameter portion 6*c*2, the caulking portion 7*b* has such a size that a part of the edge thereof protrudes out of the stepped hole 6*c*.

Figures 2A, 2B, 2C:
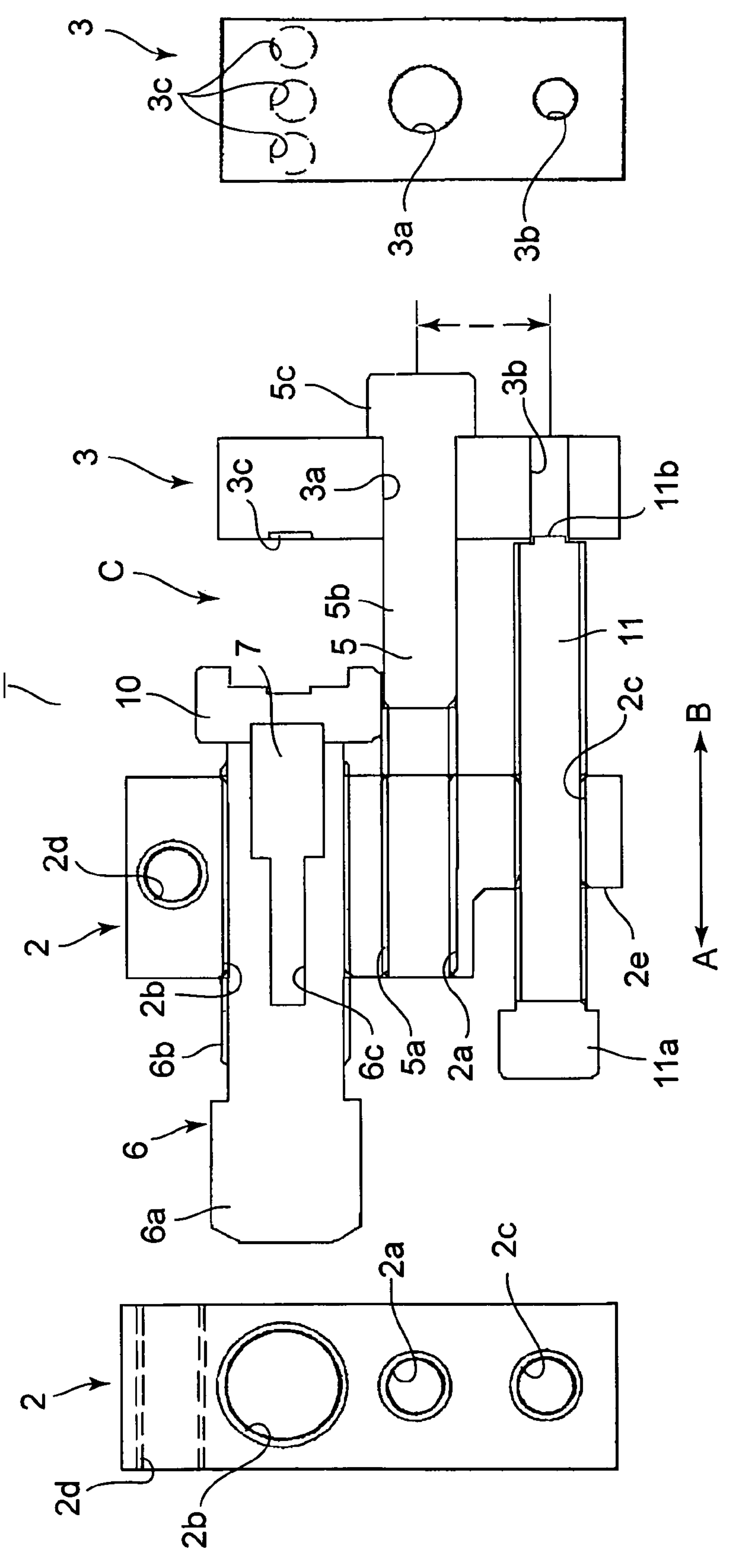
FIG. 2A is a front section view thereof, 2B is a left side view and 2C is a right side view.
Figure 5B:
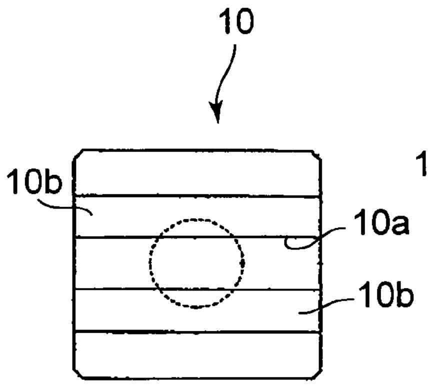
FIG. 5B is a side view and 5C is a right side view.
Figure 5A:
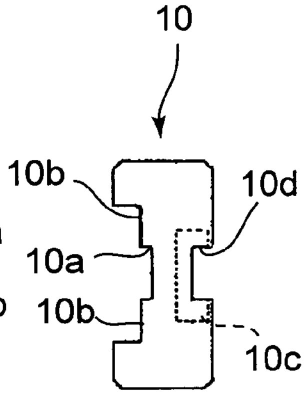
FIG. 5A is a front view thereof.
Figure 5C:
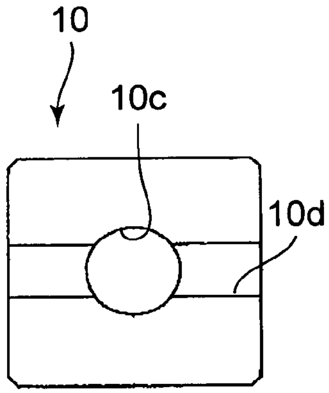

In the state in which the actuation pin 7 is stored in the pressure actuating member 6, a plate holder 10 may be attached as shown in FIG. 2A. As shown in FIGS. 5A through 5C, the plate holder 10 is a rectangular plate in which a groove 10*a* having a width slightly larger than a diameter of the pin of the chain is formed in a lateral direction at a center part of one side face of the plate and a shallow groove 10*b* having a width slightly larger than a width of a plate of the chain is formed at upper and lower parts of the groove 10*a* in the lateral direction to form a link plate attaching section. A circular concave hole (fitting section) 10*c* having a size fitting with the caulking portion 7*b* of the actuation pin 7 is formed at a center part and a concave groove 10*d* shallower than the concave hole is formed by penetrating the plate holder 10 in the lateral direction of another side face of the plate holder 10.

As shown in FIG. 2A, a pressing (tap member) 11 is screwed into the screw hole 2*c* on the other side of the first block 2. The tap bolt 11 has a head 11*a* with a hexagonal hole and a circular projection 11*b* formed at an edge thereof. The tap bolt 11 is screwed with the screw hole 2*c* from the side of the cut-away concave portion 2*e* and the edge projection 11*b* fits into the round hole (or the counter boring hole 3*c*) 3*b* of the second block 3. A grip 12 is screwed into the screw hole 2*d* of the first block 2 as shown in FIG. 1. The grip 12 is a relatively long rod member having a male screw at an end thereof and is used by being fixed integrally with the first block 2 with the male screw being screwed into the screw hole 2*d*. The grip 12 is screwed into the screw hole 2*d* in the direction orthogonal to the other screw holes 2*b*, 2*a* and 2*c* and extends in a plane orthogonal to those holes and in parallel with a pitch line of the chain.

Next, an operation (use) of the chain disconnecting and connecting tool will be explained. At first, a case of disconnecting a roller chain for a motorcycle will be explained by exemplifying operations based on a state shown in FIG. 2. That is, the tap bolt 11 is turned to move in a direction of an arrow A (pulling direction) in FIG. 2A to disengage the edge projection 11*b* from the round hole 3*b*. After rotating the second block 3 by 180 degrees centering on the coupling bolt 5 in this state, the tap bolt 11 is rotated in an opposite direction to engage the edge projection 11*b* with the center hole among the three counter boring holes 3*c*. Meanwhile, in a state in which no insertion and removal of the actuation pin 7 in/out from the stepped hole 6*c* of the pressure actuating member 6 is interfered like a case when the second block 3 is turned by 90 degrees, the actuation pin 7 stored in the stepped hole 6*c* of the pressure actuating member 6 is switched back so that the pin pulling portion 7*a* protrudes to the outside.

Then, in the state in which the second block 3 is positioned by engaging the tap bolt 11 with the center counter boring hole 3*c*, the pin pulling portion 7*a* of the actuation pin 7 is aligned coaxially with the round hole (through hole) 3*b* of the second block 3. In this state, the pressure actuating member 6 is turned to move in a direction of an arrow B so as to nip a part to be disconnected of the roller chain by the actuation pin 7 and the second block 3. At this time, one side of the pressure actuating member 6 (upper side in FIG. 2A) is opened and this opening C allows the endless roller chain to be nipped from any part of the motorcycle. Accordingly, the edge of the pin pulling portion 7*a* of the actuation pin 7 may be abutted against the pin of the roller chain by positioning the chain disconnecting and connecting tool 1 so as to cover the driven sprocket from the opening C even if it is the part where the chain is wound around the driven sprocket integral with a rear wheel tire.

Then, while suppressing the grip 12 fixed to the first block 2 by one hand, an operator may rotate the wrench or the spanner engaged with the hexagonal head 6*a* of the pressure actuating member 6. Thereby, the pressure actuating member 6 moves in the direction of the arrow B due to the screw coupling and the pin pulling portion 7*a* of the actuation pin 7 presses the pin at the point of the roller chain to be disconnected. At this time, the grip 12 is long and extends in parallel with the pitch line of the chain (or more accurately, in parallel with a tangent line to a pitch circle of the driven sprocket with respect to the chain wound around the driven sprocket), so that the grip 12 can receive a large torque reaction force acting to the pressure actuating member 6 by the wrench and others. Thereby, the chain disconnecting and connecting tool 1 may be readily held at the chain disconnecting position of the driven sprocket part and the large torque acts on the pressure actuating member 6. Furthermore, because the tap bolt 11 is positioned at the cut-away concave portion 2*e* of the first block 2, the wrench may be rotated freely at any angle without being interfered with the tap bolt 11 when the wrench engaged with the hexagonal head 6*a* of the pressure actuating member 6 is rotated. Thereby, a large pressure that enables the pin to be pulled out may act on the pin pulling portion 7*a* even if the roller chain is large and the chain pin is pulled out of the link plate and penetrates through the round hole (through hole) 3*b*.

At this time, a large force in a direction of separating the large screw hole 2*b* of the first block 2 from the round hole 3*b* of the second block 3 acts due to the large torque acting on the pressure actuating member 6. The large force acting between the first and second blocks 2 and 3 acts as a tensile force on the coupling bolt 5 and acts as a compression force to the tap bolt 11, so that the large force is supported. Also because the both bolts 5 and 11 are separated by a predetermined gap, a bending moment acting on each of the blocks 2 and 3 is small. This arrangement prevents the chain disconnecting and connecting tool 1 from deforming even if the large force described above is applied and keeps enough durability. This arrangement also allows a light-weight and compact chain disconnecting and connecting tool to be constructed without using robust and highly rigid blocks, bolts and others.

The endless chain may be disconnected and the chain may be removed out of the motorcycle by completely pulling the chain pin out of a chain bush. Then, a new bar-like (not endless) chain is wound around the driving and driven sprockets.

Next, an operation of connecting the new bar-like roller chain endlessly by using the joint link 13 (see FIG. 1) will be explained. First, the tap bolt 11 is loosened to remove the edge projection 11*b* out of the center counter boring hole 3*c*. The second block 3 is turned by 180 degrees centering on the coupling bolt 5 in this state and the tap bolt 11 is moved in the direction of the arrow B so that the edge projection 11*b* fits into the round hole (through hole) 3*b*. Meanwhile, the actuation pin 7 is pulled out of the stepped hole 6*c* of the pressure actuating member 6 to switch back so that the caulking portion 7*b* protrudes to the outside in a state having no interference. Further, the circular concave hole (fitting section) 10*c* is fitted with the protruding caulking portion 7*b* to attach the plate holder 10 to the actuation pin 7. This makes the states shown in FIGS. 1 and 2.

Then, the joint link 13 of the new roller chain is mounted between the plate holder 10 and the counter boring hole 3*c* of the second block 3. The joint link 13 is composed of a link plate and a legged plate (pin-erected plate) to which pins are implanted. Then, the chain disconnecting and connecting tool 1 is set along the new chain such that the pin portions of the legged plate fit into the counter boring holes of the both ends of the three counter boring holes 3*c* in a state in which the pins of the legged plate are fittingly inserted into bushes of link plates on the both side of the new bar-like roller chain. At this time, the chain disconnecting and connecting tool 1 may be used at the place of the chain where it is wound around the driven sprocket because one side of the chain disconnecting and connecting tool 1 is opened.

While disposing the legged plate described above by the first block 2, the link plate of the joint link 13 is attached to the shallow concave (plate attaching portion) 10*b*. In this state, the wrench is engaged with the hexagonal head 6*a* of the pressure actuating member 6 and is rotated while supporting the grip 12. Thereby, the plate attached to the plate holder 10 abuts against the pin of the legged plate and the pin of the legged plate fits into a pin hole of the plate. In this state, the new roller chain is temporarily jointed by the joint link 13 such that it is endlessly linked. In a case of a shield chain, O rings are attached between both plates of the joint link and both end links of the new chain so as to surround bushes of the chain at this time.

Next, the pressure actuating member 6 is released from the temporarily jointed new chain and the plate holder 10 is removed out of the actuation pin 7 to expose the edge of the caulking portion 7*b*. The temporarily jointed new chain is shifted by a ½ pitch to position so that one pin of the joint link fits into the center hole among the three counter boring holes 3*c*.

In this state, the wrench engaged with the pressure actuating member 6 is turned in the same manner while supporting the grip 12 to abut the edge of the caulking portion 7*b* of the actuation pin 7 to one pin of the grip 12. Then, the sloped projection 9*a* of the caulking portion 7*b* is pressed to a deformable portion at an edge of the pin of the joint link by effecting a large torque by the wrench to deform (caulk) the deformable portion at the edge of the pin outwardly and to retain and fix the plate with the chain pin. Then, while moving the pressure actuating member 6 in the direction away from the new chain, the new chain is shifted so that the other pin of the joint link fits into the center counter boring hole 3*c*. A deformable portion at an edge of the other pin of the joint link is also caulked by the caulking portion 7*b* of the actuation pin 7 by effecting again the large torque to the pressure actuating member 6. Thereby, the new roller chain may be endlessly connected and may be attached to a motorcycle (replacement of the chain is completed). It is noted that the coupling bolt 5 and the tap bolt 11 reasonably support the large force acting on the respective blocks 2 and 3 in the same manner when the chain has been disconnected and no large bending moment acts on each block.

Figures 6A, 6B, 6C:
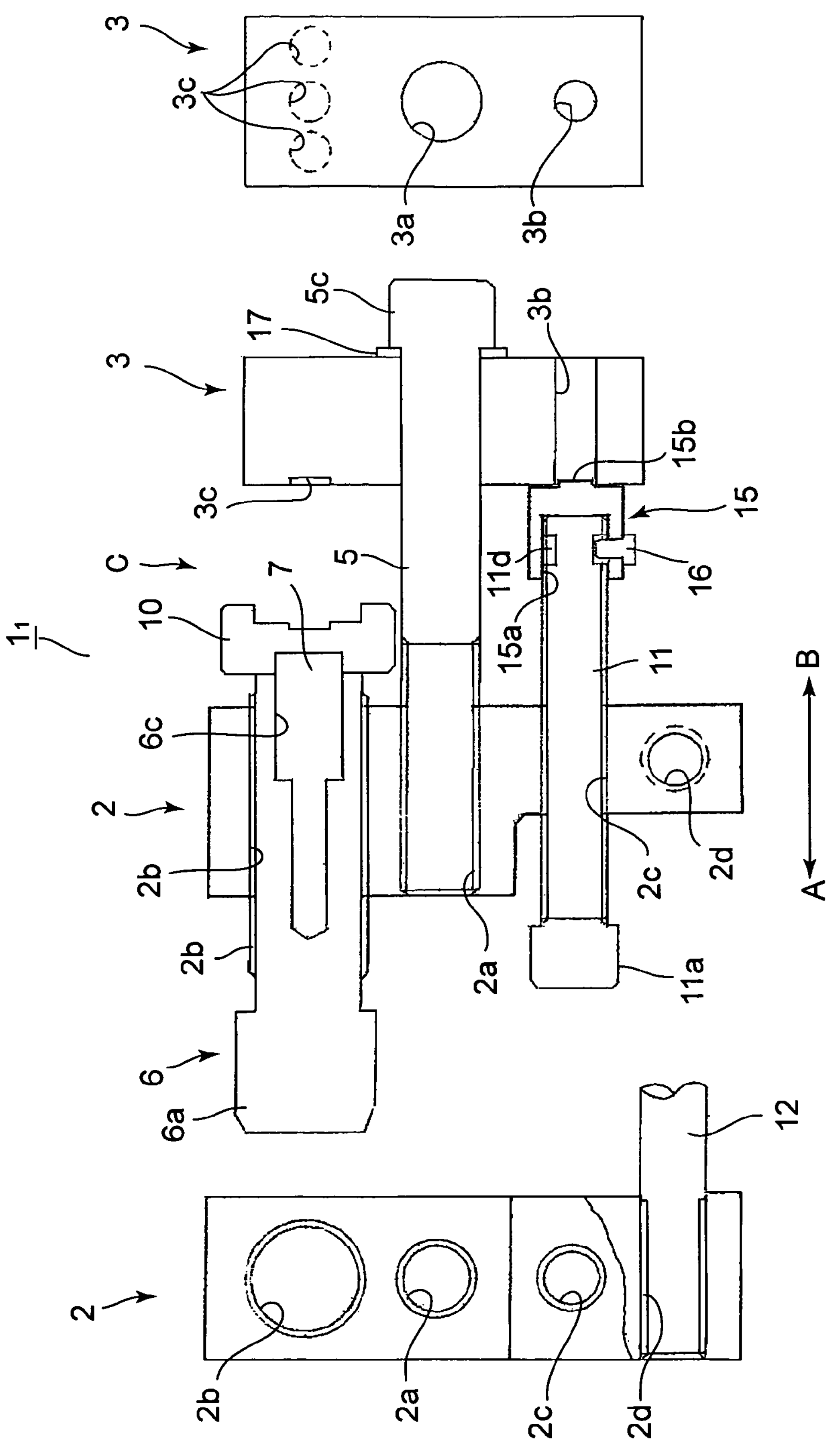
FIG. 6A is a front view thereof, 6B is a left side view and 6C is a right side view.

FIG. 6 shows a chain disconnecting and connecting tool $\mathbf{1}_1$ partially modified. It is noted that this chain disconnecting and connecting tool $\mathbf{1}_1$ differs from the chain disconnecting and connecting tool 1 of the previous embodiment only partly in that an distal end portion of the tap bolt 11 and the position for attaching the grip 12 are different, so that only the different parts will be explained and the same parts with those of the previous embodiment will be denoted by the same reference numerals and an explanation thereof will be omitted here.

A cup-like abutting member 15 is attached at the distal end portion of the tap bolt 11. The abutting member 15 receives the distal end portion of the tap bolt 11 by a hole portion 15*a*. The tap bolt 11 is provided with a ringed concave groove 11*d* formed at the edge portion. A machine bolt 16 is screwed into the abutting member 15 so that an edge of the bolt 16 engages with the concave groove 11*d*. The abutting member 15 is also provided with a circular projection 15*b* formed at an edge portion thereof. Accordingly, the abutting member 15 moves forward and backward in the directions of the arrows A and B in a body with the tap bolt 11 and is freely rotatable with respect to the tap bolt 11. This arrangement allows the coupling bolt 5 to be moved to the adequate position where no bending moment acts on it even if the edge projection 15*b* fits into the round hole 3*b* (or the counter boring hole 3*c*) and the abutting member 15 abuts the second block 3 when the tap bolt 11 rotates so as to move in the direction of the arrow A and then rotates so as to move in the direction of the arrow B without causing any trouble in the rotation of the tap bolt 11 because the abutting member 15 rotates freely with respect to the tap bolt 11.

Still more, a thrust washer 17 is interposed between the head 5*c* of the coupling bolt 5 and the second block 3. It enables the second block 3 to rotate readily when the second block 3 rotates centering on the coupling bolt 5 and can prevent the bending moment from acting on the coupling bolt 5 by giving a margin to the adequate position where the tap bolt 11 abuts the second block 3.

The chain disconnecting and connecting tool 1 is arranged such that the side of the pressure actuating member 6 (upper side in FIG. 6) is shorter and the side of the tap bolt 11 (lower side in FIG. 6) is longer than those of the previous embodiment. The screw hole 2*d* is formed in a direction orthogonal to the other screw holes 2*a*, 2*b* and 2*c* at the edge beyond the screw hole 2*c* for the tap bolt of the first block 2. The grip 12 is screwed and fixed into the screw hole 2*d*. Accordingly, the grip 12 is provided on the side separated from the pressure actuating member 6, i.e., the opening C, in the chain disconnecting and connecting tool $\mathbf{1}_1$. This arrangement allows the chain disconnecting and connecting tool $\mathbf{1}_1$ to be attached freely at any position in attaching the chain disconnecting and connecting tool $\mathbf{1}_1$ to the motorcycle chain without being disturbed by a mounting bolt, a chain cover and others of the driven sprocket because the grip 12 is positioned outwardly of the chain and the diver sprocket. This arrangement also allows the position of the chain disconnecting and connecting tool $\mathbf{1}_1$ to be readily controlled by using the grip 12, thus remarkably improving usability of the tool.

The chain disconnecting and connecting tools 1 and $\mathbf{1}_1$ may be stored by detaching the grip 12 out of the first block 2, i.e., as two parts of the grip 12 and the other members 2, 3, 5, 6, 7, 10 and 11 that are assembled in a body. Or, the respective parts may be all decomposed and may be stored by storing in cases. A plurality of actuation pins 7 whose diameter of the pin pulling portion 7*a* is different and diameter of the ringed groove 9 of the caulking portion 7*b* is different may be also prepared in advance to use properly corresponding to a size of chains. A plurality of second blocks 3 having different round hole 3*b* and counter boring holes 3*c* may be prepared and a plurality of abutting members 15 having the edge projection 15 whose diameter is different may be prepared in advance to accommodate minutely corresponding to the size of the chains.

Although the embodiments described above have been arranged so that the second block 3 rotates freely centering on the center round hole 3*a*, it is also possible to arrange so that the round hole (through hole) 3*b* is formed on one side of the second block 3 to attach the second block 3 to the first block 2 in a body without rotation and while keeping a predetermined gap by removably attaching a plate having a counter boring hole to the round hole part or by slidably attaching a slider on which a through hole and counter boring holes are disposed in line in a transverse direction. The large force acting in a direction of separating the first and second blocks 2 and 3 due to the pressure actuating member 6 is supported by the coupling member (bolt) 5 and the tap member (bolt) 11 also in this case.

Although the invention has been described by way of the exemplary embodiments, it should be understood that those skilled in the art might make many changes and substitutions without departing from the spirit and scope of the invention. It is obvious from the definition of the appended claims that the embodiments with such modifications also belong to the scope of the invention.

What is claimed is:

1. A chain disconnecting and connecting tool for disconnecting a chain by removing a pin out of the chain and for connecting the chain by deforming a pin of a chain linking member with a remainder thereof, comprising:

a first block;

a pressure actuating member engaged with the first block;

a second block having a cutout into which a head of the pin of the chain linking member may be fitted and a through hole through which the pin of the chain may be inserted, and disposed selectively with respect to the pressure actuating member so that the cutout or through hole thereof aligns with the pressure actuating member, the pressure actuating member being laterally moveable between the first and second blocks for contacting the chain pin of the chain during disconnection or connection thereof;

a coupling member for coupling the first and second blocks, and for supporting a tensile force acting thereon during disconnection or connection of the chain;

a tap member, disposed on an opposite side of the pressure actuating member with respect to the coupling member, for supporting a compressive force acting thereon during disconnection or connection of the chain, the tool being attachable to the chain from an opening of the tool at an opposite side of the tap member with respect to the coupling member; and a grip engaged with the first block for enabling a user to grasp the tool during use thereof.

2. The chain disconnecting and connecting tool as set forth in claim 1, wherein the second block has the closed cutout on one side, the through hole on the other side and a round hole disposed intermediate the cutout and the through hole for receiving a coupling member for coupling with the first block rotatably while being blocked from moving in a direction away from the first block; and the tap member is a tap bolt screwed into the first block to be freely movable forward and backward in a direction in parallel with the pressure actuating member and an end portion thereof abuts the second block and engages with either one of the through hole or the cutout so as to position the second block so that the other one of the through hole and the cutout aligns with the pressure actuating member.

3. The chain disconnecting and connecting tool as set forth in claim 1, wherein the grip is removably fixed to the first block so as to extend within a plane substantially orthogonal to a direction in which the pressure actuating member moves laterally.

4. The chain disconnecting and connecting tool as set forth in claim 1, further comprising:

an actuation pin having a longitudinal dimension and a pin removing portion in one axial direction and a deforming portion in the other axial direction; and a stepped hole formed within the pressure actuating member to store the actuation pin so that the pin removing portion or the deforming portion switchably aligns with the second block.

5. The chain disconnecting and connecting tool as set forth in claim 4, further comprising:

a plate holder having an engaging portion that engages with the actuation pin on one face and an attaching portion to which a link plate of the chain linking member may be attached on another face; and wherein the plate holder is attachable to the actuation pin stored in the pressure actuating member.

6. The chain disconnecting and connecting tool as set forth in claim 3, wherein the grip is disposed on an edge of the first block which opposes the pressure actuating member and the tap member.

7. The chain disconnecting and connecting tool as set forth in claim 2, further comprising:

an abutting member attached to an end portion of the tap bolt for movement therewith, the member being rotatable thereabout and including a protrusion formed at an edge thereof so as to be able to engage with either one of the through hole and the cutout.

* * * * *